April 15, 1958 S. D. TURK ET AL 2,830,998
NEUTRALIZATION OF ACETALDEHYDE-PARALDEHYDE
EQUILIBRIUM MIXTURES
Filed May 16, 1955
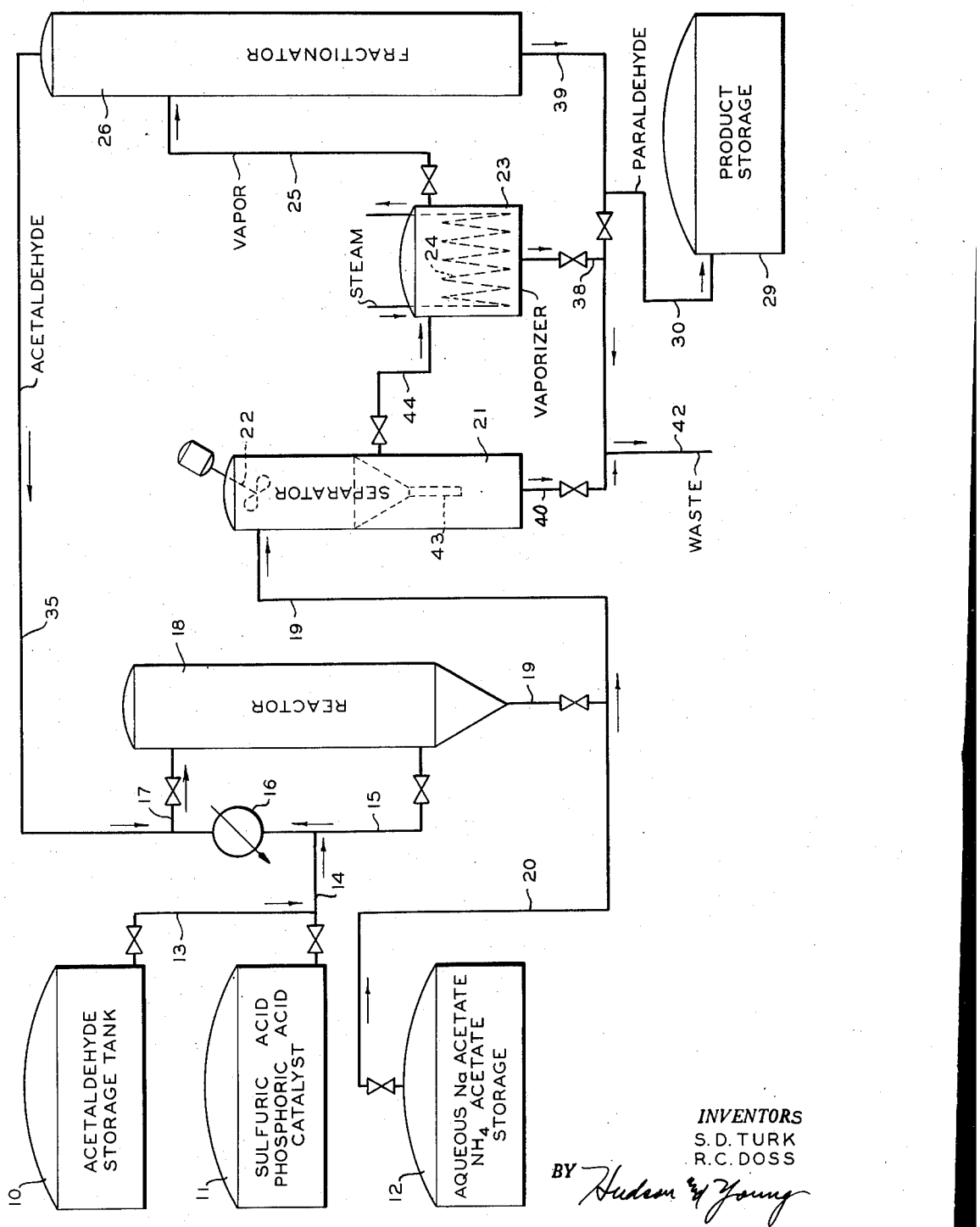
INVENTORS
S. D. TURK
R. C. DOSS
BY
ATTORNEYS

United States Patent Office 2,830,998
Patented Apr. 15, 1958

2,830,998

NEUTRALIZATION OF ACETALDEHYDE-PARALDEHYDE EQUILIBRIUM MIXTURES

Stanley D. Turk and Richard C. Doss, Bartlesville, Okla., assignors to Phillips Petroleum Company, a corporation of Delaware Application May 16, 1955, Serial No. 508,676

15 Claims. (Cl. 260—340)

This invention relates to a process for polymerizing aldehydes. In one aspect it relates to a method for neutralizing the acid catalyst in acid catalyzed aldehyde polymerization mixtures. In another aspect it relates to the use of a mixture of sodium acetate and ammonium acetate for neutralizing the acid catalyst in acid catalyst containing acetaldehyde-paraldehyde reaction mixtures in a one-step operation.

In acetaldehyde trimerization processes using mineral acid catalysts, such as sulfuric acid, or a mixture of sulfuric acid and phosphoric acid, these catalysts also catalyze the reversion of the trimer (paraldehyde) to the original aldehyde. This reversion is particularly noticeable at elevated temperatures such as those used in distilling the acetaldehyde from the paraldehyde in the acid reaction mixture.

The use of a mixture of sulfuric acid and phosphoric acid as a superior aldehyde trimerization catalyst, as described briefly herein, is fully disclosed in a copending application Serial No. 468,874, filed November 15, 1954.

One step in the production of trimers of, for example, aliphatic aldehydes, is the neutralization of the acid of the aldehyde-trimer reaction mixture so that reversion of trimer to the original aldehyde will not take place during a subsequent distillation operation. Numerous methods have been used in the past to neutralize the acid of such reaction mixtures to prevent this reversion, but all of these methods possess inherent disadvantages, especially when applied to operation on a commercial scale. For example, a two-step neutralization process as used in the past utilizes an aqueous solution of sodium carbonate followed by addition of ammonium hydroxide or an amine. Such a two-step operation requires additional equipment over that required by a one-step operation. Another disadvantage to the sodium carbonate method, is that sodium carbonate exhibits an inverse solubility effect, that is, acetaldehyde tends to dissolve in the aqueous sodium carbonate solution and to cause the sodium carbonate to precipitate out. Other processes for neutralizing such acid containing mixtures employ sodium acetate as the neutralizing agent, but this neutralizer does not prevent reversion of trimer to aldehyde. Ammonium acetate, which also has been used as a neutralizer does prevent this reversion, but gives off ammonia at distillation temperatures. The liberated ammonia reacts with acetaldehyde to form acetaldehyde-ammonia, a crystalline compound which results in loss of aldehyde. This compound subsequently deposits in pipes and vessels throughout the equipment, thereby necessitating cleaning of equipment.

An object of our invention is to provide a simple and easily operable process for the production of useful trimers from certain aldehydes.

Another object of our invention is to provide a process for neutralizing in a one-step operation, the acid-containing reaction mixture of certain aldehydes and their trimers.

Still another object of our invention is to provide such a process which is simple to operate and promotes increased yield of desired product.

One specific object of our invention is to provide a simple and efficient method for neutralizing the acid of an acid-containing acetaldehyde-paraldehyde reaction mixture.

Still other objects, advantages and features of our invention will become apparent from the following detailed description taken in conjunction with the accompanying drawing, in which the figure is a flow diagram illustrating the process of our invention.

We achieve these and other objects and advantages in the production of trimers from aliphatic aldehydes containing from 2 to 7 carbon atoms per molecule by neutralizing an acid containing reaction mixture of the aldehyde and its trimer by adding thereto an aqueous solution of sodium acetate and ammonium acetate. The 2 to 7 carbon atom aldehydes, the acid of the acid-containing reaction mixtures of which is neutralized by our process, are, in addition to acetaldehyde, propionaldehyde, valeraldehyde, caproaldehyde, heptaldehyde, and the corresponding isomeric aldehydes. For illustrative purposes, we will describe our invention as applied to the neutralization of an acid-containing acetaldehyde-trimer (paraldehyde) mixture, but it is to be understood that our neutralization process is equally applicable to acid-containing reaction mixtures of the above-mentioned aliphatic aldehydes and their polymers.

Referring now to the drawing, reference numeral 10 identifies an acetaldehyde storage tank while reference numerals 11 and 12 identify, respectively, storage tanks for the acid reaction catalyst and the aqueous sodium acetate-ammonium acetate neutralizer of our invention.

The aldehyde, i. e., acetaldehyde and acid catalyst, as the above-mentioned sulfuric acid-phosphoric acid catalyst mixture, are charged through lines 13 and 14 into line 15. Since the polymerization reaction is exothermic, a cooler 16 is provided in line 15 for temperature control in the vessel 18. The cooled contents of line 15 are passed from the cooler 16 on through line 17 into a reactor vessel 18. To make certain that the reactants are properly mixed, recycle reaction mixture is passed from the lower portion of vessel 18 through the line 15 and is added to the original charge stock of aldehyde and acid prior to their entry to the cooler 16. The cooler 16 is so operated that the contents of the tank are maintained between the temperature limits of about 32° to 140° F., and preferably for commercial operation between about 100° to 120° F. However, temperatures outside these ranges can, under some conditions, be used.

Reaction mixture is continuously withdrawn through pipe 19 and is passed into a mixing vessel 21. The aqueous sodium acetate-ammonium acetate neutralizing mixture from tank 12 is passed through line 20 into line 19 in which it is mixed with the acid-acetaldehyde-trimer reaction mixture. The neutralizing solution and the reaction mixture then enter the upper portion of tank 21 in which a stirrer 22 is provided. The stirrer is so operated as to mix thoroughly the reaction mixture from reactor 18 and the neutralizing solution from tank 12 in a manner such that the acid content is completely neutralized. It is necessary to neutralize the acid catalyst because acid catalysts catalyze the reversion of paraldehyde to acetaldehyde as well as the polymerization reaction.

The neutralized contents of the upper portion of tank 21 flow downward through trap 43 into a settling zone and the organic material rises upward under the trap while the aqueous solution settles to the bottom of the vessel. The aqueous solution is removed from tank 21 through pipes 40 and 42 to waste, or such other disposal as desired.

The upper, organic material layer from the settling zone in tank 21 is passed through line 44 into vaporizer 23 in which it is heated by a steam coil 24. Suitable conditions maintained in the vaporizer 23 are a pressure of about 30 pounds per square inch gauge and a temperature of about 338° F. From this vaporizer, heavy material settling therein is withdrawn through pipes 38 and 42. The vaporized material is passed through pipe 25 into a fractional distillation column 26.

In this distillation column, means are provided, as understood by those skilled in the art for separating acetaldehyde from the trimer, the latter being withdrawn through pipes 39 and 30 and passed to product storage tank 29. The acetaldehyde is passed through pipe 35 and is added to the material being charged to the reactor 18 through pipe 17.

The mixed sodium acetate-ammonium acetate neutralizing agent of our invention is used in ratios in the range of 5 to 200 parts sodium acetate per 1 part ammonium acetate by weight. A preferred range, however, is from about 10 to 40 parts of sodium acetate per 1 part ammonium acetate by weight. This mixed salt neutralizing agent is used in aqueous solutions containing from about 5 percent by weight of the mixed salts up to and including about 40 percent by weight of the mixed salts. It is preferred, however, to use solutions containing about 20 percent or more of the neutralizing material by weight because of the tendency of acetaldehyde to dissolve in the aqueous phase. Thus, by using a solution of relatively high concentration the volume of the aqueous solution employed in the neutralization is thereby held at a minimum, and the smaller volume of the solution of course, dissolves less acetaldehyde thereby minimizing loss of the aldehyde. This saving in acetaldehyde represents an additional advantage of our process over the two-step prior art method of neutralizing with sodium carbonate solution followed by addition of ammonia or ammonium hydroxide. Due to the fairly low solubility of sodium carbonate in water, large quantities of water must be used in order to dissolve the amount of sodium carbonate required for neutralization and this large quantity of water present in the system dissolves relatively large quantities of acetaldehyde which are, of course, lost to the process. The amount of our neutralizer material used should be at least the stoichiometric equivalent required to neutralize the acid, and it is preferred to use an excess of from 50–100 percent.

The method of our invention is particularly effective when used in conjunction with a continuous process but it is equally applicable to batch processing.

Illustrative of the operation of the process of our invention acetaldehyde-paraldehyde mixtures were prepared by injecting sulfuric acid-phosphoric acid catalyst into a mixture of acetaldehyde and paraldehyde maintained at 105° F. This reaction mixture was maintained at this temperature until equilibrium between the acetaldehyde and paraldehyde was reached, under which condition the mixture contained about 21 percent acetaldehyde by weight. After equilibrium was reached, samples of the mixture were removed and then treated as follows: One sample was introduced into an elongated vertically disposed vessel, provided with a stirrer, through a feed inlet near the top. An inlet for adding aqueous neutralizing solution was also provided near the top of the vessel while outlets for the separated aqueous layer and for the neutralized organic material were provided in the bottom and at an intermediate level, respectively. A trap similar to trap 43 in vessel 21 of the drawing, was provided within the vessel through which reaction mixture could flow downward and under which the layer of organic material could separate. This vessel was then filled with the paraldehyde-acetaldehyde equilibrium mixture. The mixture was then neutralized by slowly adding the required amount of aqueous neutralizing solution. This neutralizing solution was dispersed in the upper and neutralizing section of the vessel by a stirrer. A continuous run was then started by pumping additional equilibrium mixture into the vessel at a fixed rate and simultaneously adding more neutralizing agent. Collection of the neutralized reaction effluent and the spent aqueous layer were started and continued throughout the run.

Approximately 250 grams of the neutralized acetaldehyde-paraldehyde equilibrium mixture at 105° F. from a neutralization operation similar to that described above was distilled in a packed distillation column which had been previously refluxed with acetone, washed with aqueous ammonia, refluxed with distilled water for several hours and finally refluxed with acetone. The distillation operation was then started and cuts were taken boiling from 70° to 176° F., 176° to 248° F., and 248° to 255° F. The lower boiling fractions were collected in an ice cooled receiver. The several fractions collected were then combined and a chemical analysis for acetaldehyde was made on this combined material and a material balance was made. The maximum temperature in the head section of the still during the distillation was recorded. At a temperature of 105° F. the equilibrium mixture contained approximately 21% acetaldehyde by weight. Several neutralization and distillation runs were made using the above procedure. The results of these runs are summarized below in Table I.

TABLE I

| Run No. | Catalyst | Neutralizing Agents A | Neutralizing Agents B | Weight Ratio, A/B | Quantity of Neutralizing Agents, Wt. Percent of Equil. Mix. A | Quantity of Neutralizing Agents, Wt. Percent of Equil. Mix. B | Wt. percent of Neut. Matl. in Aqueous Solution | Wt. percent Acetaldehyde in dist. product | Max. Still Head Temp., °F. | Reversion to Acetaldehyde |
|---|---|---|---|---|---|---|---|---|---|---|
| 1 | 0.15% $H_2SO_4$+0.15% $H_3PO_4$ | $CH_3COONa$ | | | 0.95 | | 20.0 | >24 | 230 | Yes. |
| 2 | 0.15% $H_2SO_4$+0.15% $H_3PO_4$ | $CH_3COONH_4$ | | | 0.9 | | 10.0 | 19.1 | 255 | No. |
| 3 | 0.15% $H_2SO_4$+0.15% $H_3PO_4$ | $CH_3COONa$ | $CH_3COONH_4$ | 10/1 | 0.85 | 0.09 | 20.0 | 20.6 | 255 | No. |
| 4 | 0.15% $H_2SO_4$+0.15% $H_3PO_4$ | $CH_3COONa$ | $CH_3COONH_4$ | 20/1 | 0.90 | 0.04 | 20.0 | 19.4 | 254 | No. |
| 5 | 0.15% $H_2SO_4$+0.15% $H_3PO_4$ | $CH_3COONa$ | $CH_3COONH_4$ | 180/1 | 0.90 | 0.005 | 20.0 | 21.5 | 255 | No. |

In these runs, the quantity of inorganic neutralizing agent was equivalent to 150% of the stoichiometric requirement for the total acid present ($H_2SO_4$+$H_3PO_4$).

Since paraldehyde boils at about 255° F. at atmospheric pressure, it is obvious that in runs 2, 3, 4, and 5, no or substantially no reversion of paraldehyde to acetaldehyde took place during the distillation. In run No. 2 some reversion did take place.

Equilibrium mixtures prepared and neutralized according to the procedure outlined were evaporated to dryness to determine the amount of non-volatile residue present. Runs 7, 8 and 9 giving these data are shown in Table II. Run 6 was similar to runs 7, 8 and 9 excepting that ammonium acetate alone was used as the neutralizing agent.

TABLE II

*Percent non-volatile residue*

| Run No. | Catalyst | Neutralizing Agents | Percent Aqueous Solution | Percent Residue of Total Organic Effluent |
|---|---|---|---|---|
| 6 | 0.15% $H_2SO_4$+0.15% $H_3PO_4$ | $CH_3COONH_4$ | 10.0 | 0.43 |
| 7 | 0.15% $H_2SO_4$+0.15% $H_3PO_4$ | $CH_3COONa$ (20 parts)+ $CH_3COONH_4$ (1 part) | 10.0 | 0.20 |
| 8 | 0.15% $H_2SO_4$+0.15% $H_3PO_4$ | $CH_3COONa$ (20 parts)+ $CH_3COONH_4$ (1 part) | 20.0 | 0.18 |
| 9 | 0.15% $H_2SO_4$+0.15% $H_3PO_4$ | $CH_3COONa$ (180 parts)+ $CH_3COONH_4$ (1 part) | 20.0 | 0.15 |

In runs 8 and 9, the amount of neutralizing agent used was equivalent to 150% of the stoichiometric requirement for the total acid ($H_2SO_4$+$H_3PO_4$), while in runs 6 and 7, the amount of neutralizing agent used was equivalent to 150% of the stoichiometric requirement for the sulfuric acid only. It is noted from Table II that the residue left after vaporization of the volatile material was lower when using our mixture of sodium acetate and ammonium acetate to neutralize the acid of the acid-acetaldehyde-paraldehyde mixture than when using ammonium acetate alone.

Two continuous runs were made in order to compare a prior art neutralization process with the process of our invention. The preparation and neutralization for run 11 of this example were carried out in the same manner as outlined above. The results of runs 10 and 11 are given below in Table III.

TABLE III

*Continuous neutralization runs*

| | Run 10 | Run 11 |
|---|---|---|
| Acid catalyst neutralized | 0.15% $H_2SO_4$ | 0.15% $H_2SO_4$+0.15% $H_3PO_4$. |
| Neutralizing Agent | $Na_2CO_3$ | $CH_3COONa$ (20) + $CH_3COONH_4$ (1) by weight. |
| Conc. in aq. solution, wt. percent | 5.0 | 20. |
| Wt. of aq. solution feed per 100 g. of organic feed | 9.5 | 4.8. |
| Analysis of Effluent Water Layer: | | |
| Acetaldehyde, wt. percent | 5.7 | 7.1. |
| Acetaldehyde+Paraldehyde, weight percent | 9.9 | 13.34. |
| Loss of organic feed in water layer, wt. percent | 1.3 | 0.35. |

In run 10, salt precipitation took place at the organic feed inlet and carbon dioxide formed a gas pocket at the top of the vessel. In run 11, no salt precipitation occurred. It should be noted from run No. 11 that the loss of organic material in the aqueous layer was considerably less when using our neutralizing agents than when using sodium carbonate of the prior art.

Other combinations of metal and ammonium salts of organic acids can also be used in the neutralization step of our invention. Such other metal and ammonium salts are sodium propionate-ammonium propionate, sodium acetate-ammonium propionate, sodium propionate-ammonium acetate, potassium acetate ammonium acetate, potassium propionate-ammonium acetate, potassium acetate-ammonium propionate, potassium propionate-ammonium propionate, and the like provided the salts are sufficiently soluble in water to provide aqueous solutions of the concentrations by weight as herein disclosed. On referring to Table III above, it should be noted that in run No. 10 the weight percent of sodium carbonate in the neutralization solution was 5.0 while 20 percent by weight of sodium acetate and ammonium acetate were used in the neutralizing solution of run 11. Furthermore, 9.5 parts by weight per hundred parts by weight of organic feed were used in the sodium carbonate neutralizing step while only 4.8 parts by weight of a 20 percent acetate solution was required in run 11. 9.5 parts by weight of the 5 percent sodium carbonate solution containing .475 part by weight sodium carbonate were used. In the analysis of the aqueous layers obtained in runs 10 and 11, it should be noted that the sodium carbonate aqueous layer contained 5.7 weight percent acetaldehyde while the aqueous layer from the acetate neutralizing operation contain 7.1 percent acetaldehyde. However, thet total amount of acetaldehyde lost in the acetate solution was actually less than that lost in the carbonate solution because only approximately half as much acetate solution by weight was required in comparison to the weight of the carbonate solution. Based upon the organic feed charged to the operation, the loss of acetaldehyde and paraldehyde in the aqueous layer in the sodium carbonate run was 1.3 weight percent in comparison to 0.35 weight percent when using our neutralizing agent. Thus, the loss of organic material in the aqueous neutralizing solution was approximately one-fourth that lost when using the prior art sodium carbonate neutralization method.

Materials of construction for the processing apparatus can in general be selected from commercially available materials taking into consideration corrosive properties of materials in process.

We claim:

1. In the method of forming trimmers from aliphatic aldehydes by the catalytic action of mineral acid catalysts, the improvement comprising adding to the acid aldehyde-trimer reaction mixture sufficient of an aqueous solution of sodium acetate and ammonium acetate containing 5 to 200 parts by weight of sodium acetate per part of ammonium acetate to neutralize the acid of the reaction mixture.

2. The method of claim 1 wherein the acid of the acid aldehyde-trimer reaction mixture is a mixture of sulfuric acid and phosphoric acid.

3. In the method of producing a trimer from an aliphatic aldehyde having 2 to 7 carbon atoms per molecule by trimerization in the presence of sulfuric acid and phosphoric acid, the improvement comprising adding to the acid aldehyde-trimer reaction mixture sufficient of an aqueous solution of sodium acetate and ammonium acetate containing from 5 to 200 parts by weight of sodium acetate per part of ammonium acetate and sufficient to neutralize the acids of said mixture, fractionally distilling the organic material of the neutralizing operation and thereby separating said trimer from aldehyde, and recovering the trimer-containing fraction.

4. In a method for the production of paraldehyde by polymerization of acetaldehyde in the presence of a mineral acid catalyst, the improvement comprising adding to the acid acetaldehyde-paraldehyde reaction mixture sufficient of an aqueous solution of sodium acetate and ammonium acetate containing from 5 to 200 parts by weight of sodium acetate per part of ammonium acetate to neutralize the acid of the acid reaction mixture.

5. In a method for the production of paraldehyde by polymerization of acetaldehyde in the presence of a mineral acid catalyst, the improvement comprising adding to the acid acetaldehyde-paraldehyde reaction mixture sufficient of an aqueous solution of sodium acetate and ammonium acetate containing from 10 to 40 parts by weight of sodium acetate per part of ammonium acetate to neutralize the acid in the acid reacton mixture.

6. In a method for the production of paraldehyde by polymerization of acetaldehyde in the presence of a mineral acid catalyst, the improvement comprising adding to the acid acetaldehyde-paraldehyde reaction mixture sufficient of an aqueous solution of sodium acetate and ammonium acetate containing from 5 to 200 parts by weight of sodium acetate per part of ammonium acetate to neutralize the acid of the acid reaction mixture, and said aqueous solution of sodium acetate and ammonium acetate contains from 5 to 40 percent by weight of said acetates.

7. In a method for the production of paraldehyde by polymerization of acetaldehyde in the presence of a mineral acid catalyst, the improvement comprising adding to the acid acetaldehyde-paraldehyde reaction mixture sufficient of an aqueous solution of sodium acetate and ammonium acetate containing from 5 to 200 parts by weight of sodium acetate per part of ammonium acetate to neutralize the acid of the acid reaction mixture, and wherein the amount of sodium acetate and ammonium acetate in the added aqueous solution of sodium acetate and ammonium acetate is at least the stoichiometric equivalent of the acid content of said acid acetaldehyde-paraldehyde reaction mixture.

8. In a method for the production of paraldehyde by polymerization of acetaldehyde in the presence of a mineral acid catalyst, the improvement comprising adding to the acid acetaldehyde-paraldehyde reaction mixture sufficient of an aqueous solution of sodium acetate and ammonium acetate containing from 50 to 200 parts by weight of sodium acetate per part of ammonium acetate to neutralize the acid of the acid reaction mixture, and wherein the amount of sodium acetate and ammonium acetate in the aqueous sodium acetate and ammonium acetate added to said reaction mixture is between the limits of the stoichiometric equivalent of the acid content of said acid reaction mixture and 150 percent of said stoichiometric equivalent.

9. In the method of forming trimers from aliphatic aldehydes containing 2 to 7 carbon atoms per molecule by the catalytic action of mineral acid catalysts, the improvement comprising adding to the acid aldehyde-trimer reaction mixture an aqueous solution of sodium acetate and ammonium acetate containing from 5 to 200 parts sodium acetate by weight per part of ammonium acetate, and wherein the amount of sodium acetate and ammonium acetate of the aqueous sodium acetate and ammonium acetate added to said reaction mixture is at least the stoichiometric equivalent of the acid content of the acid aldehyde-trimer reaction mixture.

10. In the method of forming trimers from aliphatic aldehydes containing 2 to 7 carbon atoms per molecule by the catalytic action of mineral acid catalysts, the improvement comprising adding to the acid aldehyde-trimer reaction mixture an aqueous solution of sodium acetate and ammonium acetate containing from 10 to 40 parts sodium acetate by weight per part of ammonium acetate, and wherein the amount of sodium acetate and ammonium acetate of the aqueous sodium acetate and ammonium acetate added to said reaction mixture is at least the stoichiometric equivalent of the acid content of the acid aldehyde-trimer reaction mixture.

11. In the method of forming trimers from aliphatic aldehydes containing 2 to 7 carbon atoms per molecule by the catalytic action of mineral acid catalysts, the improvement comprising adding to the acid aldehyde-trimer reaction mixture an aqueous solution of sodium acetate and ammonium acetate containing from 5 to 40 percent by weight of said acetates, and wherein the amount of sodium acetate and ammonium acetate of the aqueous sodium acetate and ammonium acetate added to said reaction mixture is at least the stoichiometric equivalent of the acid content of the acid aldehyde-trimer reaction mixture.

12. In the method of forming trimers from aliphatic aldehydes containing 2 to 7 carbon atoms per molecule by the catalytic action of mineral acid catalysts, the improvement comprising adding to the acid aldehyde-trimer reaction mixture an aqueous solution of sodium acetate and ammonium acetate containing from 20 to 40 percent by weight of said acetates and the amount of sodium acetate and ammonium acetate of the aqueous sodium acetate and ammonium acetate added to said reaction mixture is at least the stoichiometric equivalent of the acid content of the acid aldehyde-trimer reaction mixture.

13. In the method of producing paraldehyde by trimerization of acetaldehyde with sulphuric acid and phosphoric acid, the improvement comprising adding to the acid aldehyde-paraldehyde reaction mixture sufficient of an aqueous solution of sodium acetate and ammonium acetate containing from 5 to 200 parts by weight of sodium acetate per part of ammonium acetate and sufficient to neutralize the acids of said mixture, separating the neutralized material into an organic phase and an aqueous phase, and fractionally distilling the organic phase and recovering from the distilling operation paraldehyde as a product of the process.

14. In the method of producing paraldehyde by trimerization of acetaldehyde with sulphuric acid and phosphoric acid, the improvement comprising adding to the acid aldehyde-paraldehyde reaction mixture sufficient of an aqueous solution of sodium acetate and ammonium acetate containing from 5 to 200 parts by weight of sodium acetate per part of ammonium acetate and sufficient to neutralize the acids of said mixture, separating the neutralized material into an organic phase and an aqueous phase, and fractionally distilling the organic phase and recovering from the distilling operation paraldehyde as a product of the process, and wherein the aqueous solution of sodium acetate and ammonium acetate contains from 5 to 40 percent by weight of said acetates.

15. In a method for the production of paraldehyde by polymerization of acetaldehyde in the presence of a mineral acid catalyst, the improvement comprising adding to the acid acetaldehyde-paraldehyde reaction mixture sufficient of an aqueous solution of sodium acetate and ammonium acetate containing from 5 to 200 parts by weight of sodium acetate per part of ammonium acetate to neutralize the acid of the acid reaction mixture, and said aqueous solution of sodium acetate and ammonium acetate contains from 20 to 40 percent by weight of said acetates.

(References on following page)

References Cited in the file of this patent

UNITED STATES PATENTS

| | | |
|---|---|---|
| 1,300,451 | Morton et al. | Apr. 15, 1919 |
| 2,318,341 | Thompson | May 4, 1043 |
| 2,327,570 | Vogel | Aug. 24, 1943 |
| 2,442,942 | Tuerck et al. | June 8, 1948 |
| 2,571,759 | Quinn et al. | Oct. 16, 1951 |

FOREIGN PATENTS

| | | |
|---|---|---|
| 99,663 | Switzerland | May 20, 1922 |

OTHER REFERENCES

Krczil: "Kurzes Handbuch der Polymerationstechnik," vol. 1, pp. 494–6, Akademische Verlagsgesellschaft Becker and Erler. Kom. Ges. (Leipzig, 1940).